Patented Dec. 5, 1922.

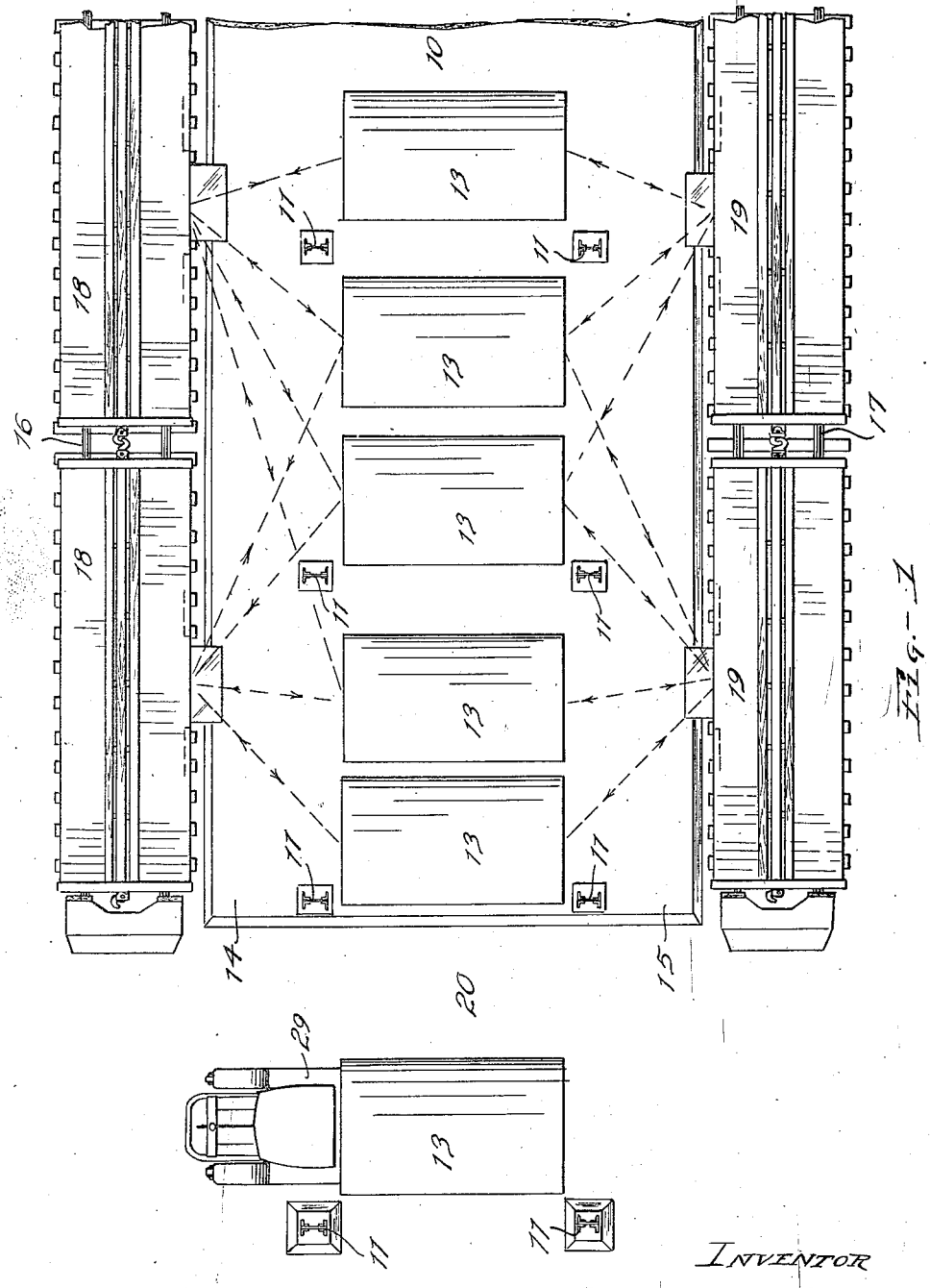

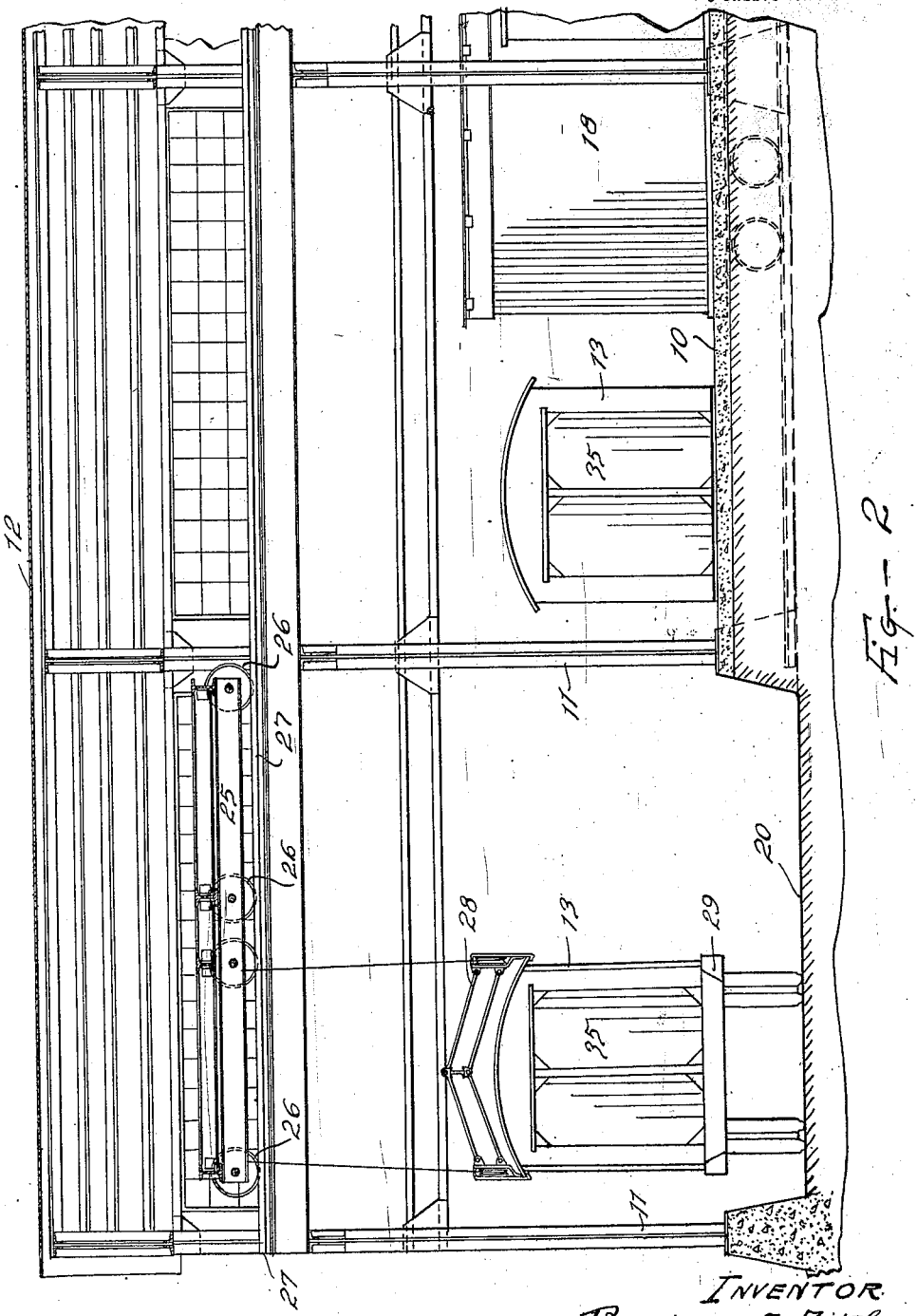

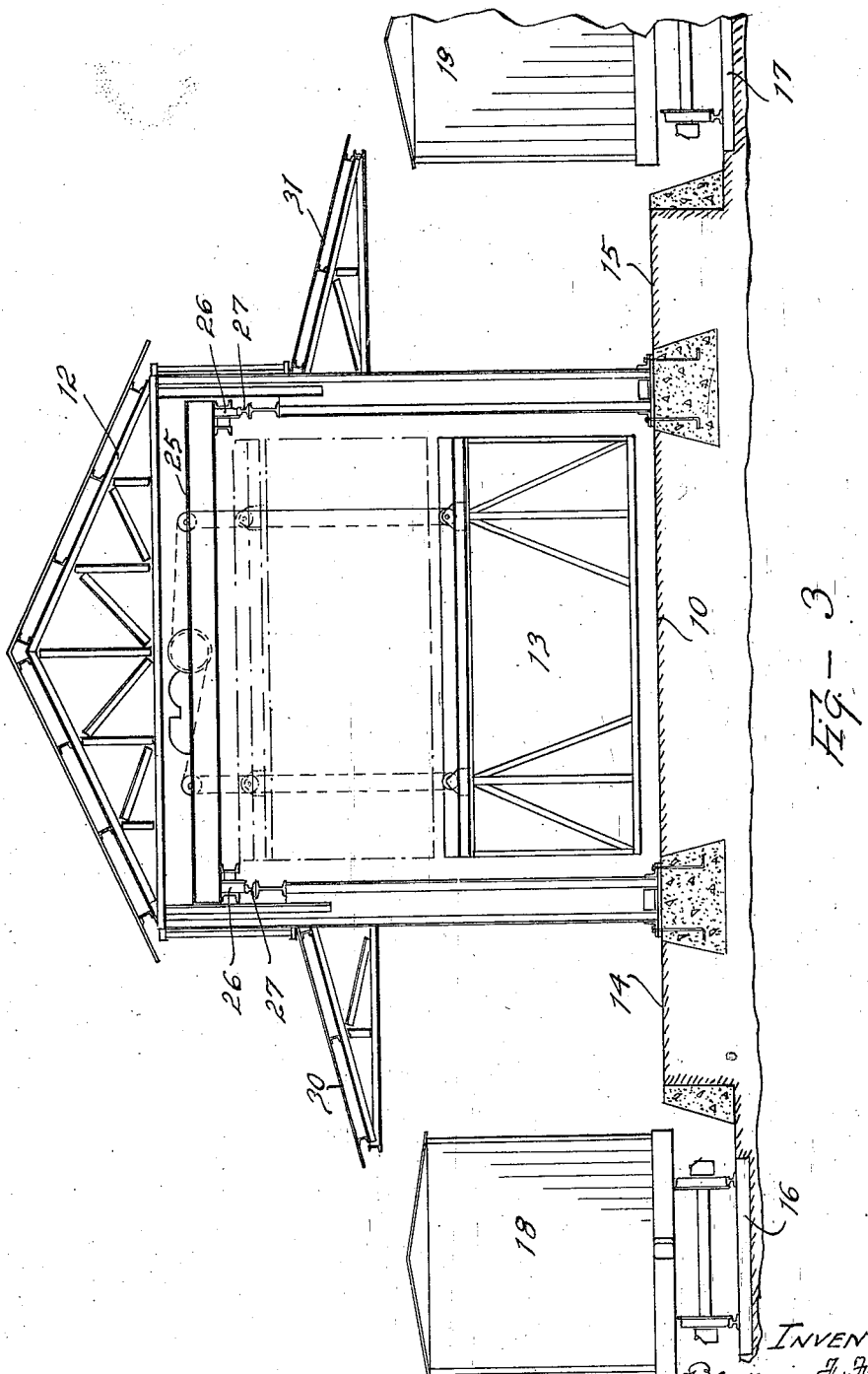

1,437,968

UNITED STATES PATENT OFFICE.

BENJAMIN F. FITCH, OF EVANSTON, ILLINOIS.

FREIGHT-TRANSFERRING APPARATUS.

Application filed July 7, 1921. Serial No. 482,926.

*To all whom it may concern:*

Be it known that I, BENJAMIN F. FITCH, a citizen of the United States, residing at Evanston, in the county of Cook and State of Illinois, have invented a certain new and useful Improvement in Freight-Transferring Apparatus, of which the following is a full, clear, and exact description, reference being had to the accompanying drawings.

This invention relates to a system for handling freight such as is used for example, in a terminal station for the distribution of package freight in less than carload lots. My invention is particularly applicable in connection with a system for handling freight wherein removable automobile bodies are used for storing and transporting freight. Such a system is set forth in Patent No. 1,275,145, issued to me on August 6, 1918.

In handling package freight involving less than carload lots, it is necessary, particularly at terminal stations, to "break bulk" for removing some or all of the freight, and transferring it either to sub-stations or to cars for direct line movement. Usually, this transfer is accomplished by positioning the cars to be loaded and unloaded adjacent the platform, and by hand trucking the freight from one car to another across the platform. These transfer cars are then destined either for direct line movement or for sub-station transfer for similar rehandling and distribution.

In handling and distributing package freight at terminal stations considerable time has been lost by handling each package individually from a transfer truck to the platform, and then from a storage space on the platform to the proper car. Ordinarily, freight brought to the station in the morning of one day is not moved until the current night, and, accordingly, is subjected to at least a twenty-four hour delay before it is ready for delivery to the consignee. Furthermore, in trucking the freight from the platform to the car and vice versa, it frequently happens that the freight is positioned near one end of the platform and the car destined to receive the freight is located near the other end thereof. This, of course, necessitates considerable time for hand trucking, and consequently tends to congest traffic at the freight station.

To eliminate the delay incident to handling each package more than once after it has arrived at the station, and consequently to facilitate the transfer of the freight to and from the cars, my invention contemplates the provision of a system wherein the package freight may be stored in removable automobile bodies, and transferred to a terminal station, where provision is made for inbound and outbound railroad lines.

In transferring the freight between the cars and bodies, my invention contemplates further a particular relation between the inbound and outbound lines and the bodies, so that during one period of the day the entire platform may be employed as an inbound station and during another period as an outbound station. In this connection, my invention tends to decrease the time employed in trucking each package from the cars to the bodies, and vice versa, by arranging suitable overhead hoisting mechanism which is adapted to engage a body, raise it, transport it overhead, and deposit it in position adjacent the car which is being emptied or loaded, as the case may be.

To install a system according to my invention, the requirements for expensive realty adjacent present terminal stations is dispensed with, and since the freight may be brought to and from the station by automobile trucks, and therefore the transfer point at such station may be located in the suburbs of a city, where the property to be acquired is materially less in cost. In this connection, my invention provides for necessary expansion, such expansion being accomplished merely by adding sections of a building to the existing structure and by extending the inbound and outbound lines a proportionate amount. The means for accomplishing the above objects will be hereinafter fully described, and the essential characteristics and features will be set forth in the claims.

In the drawings, Fig. 1 is a plan view of a portion of a freight terminal station having inbound and outbound transportation lines and having provision for receiving removable automobile bodies; Fig. 2 is a vertical section taken longitudinally through the station shown in Fig. 1; Fig. 3 is an end view of such station.

My invention centemplates in general the provision of a system for handling package freight wherein removable automobile bodies are employed for transferring the freight from one station to another within a city or within the limits of the truck operation. In this connection, my invention provides for facilitating the transfer of package freight at a "break bulk" point. Accordingly, in the various figures I have shown a terminal station as having a platform 10, which supports columns 11 of an overhead structure, indicated generally at 12. The space on the platform extending longitudinally of the platform and between the columns constitutes a storage space for removable automobile bodies 13, while the space outside the column, as at 14 and 15, constitutes a truck runway for the hand trucking of freight to and from the bodies.

The station platform 10 is arranged to be positioned intermediate sets of railroad tracks 16 and 17 on which are positioned cars 18 and 19 which may be designated inbound or outbound respectively. Adjacent one end of the platform, I provide an automobile truck runway 20, and I provide means for removing an enclosed body from an automobile truck in such runway, for raising it, transporting it and then depositing it upon the platform 10.

The station proper may extend the entire length of the platform 10 and may be constructed of sections which are arranged to be placed end to end, in accordance with the length of the station desired. The space between the columns in which the bodies are positioned is preferably slightly greater than the length of one of the bodies positioned therein, and the bay length is preferably sufficient to permit two bodies to be placed side by side between adjacent columns.

As a means for raising and transporting the bodies lengthwise of the platform, I have shown an overhead crane, indicated generally at 25, which travels on the wheels 26 and is supported on the rails 27, these rails being carried by the inner portions of the columns 11. The distance of the crane above the platform is such that one body may be raised and transported overhead and across another body positioned on the platform.

In Fig. 2, I have shown the crane trackway 27 as extending over the automobile runway 20, and I have shown the crane as provided with a cradle 28 which is adapted to engage a body to lift it from the truck 29 for transportation to a suitable location on the platform. By providing an overhead crane for transferring the bodies from one point to another, it is therefore possible to decrease the width of the crane runway to an amount which is only slightly greater than the length of a body, this being due to the fact that no space is required between the columns and bodies for hand trucking or for other purposes. The hand trucking platforms 14 and 15 on each side of the building 12 provide sufficient space for transporting packages between the cars and bodies. To protect such platforms, I provide canopies 30 and 31 on each side of the building 12.

Each removable automobile body is provided with a door 35 on each end thereof, which door may be of any suitable construction, but preferably of the removable type. When the bodies are placed upon the platform in the position shown in Fig. 1, then as soon as the doors are removed from either end, the contents may be quickly transported between the bodies and the railroad cars positioned on the side of the platform adjacent the open end of the body.

Whenever it is desired to place the body nearer to the car to or from which the contents are being transferred, it is only necessary to engage such body by the crane, lift it, transport it overhead and then deposit it adjacent the car in question. By arranging the body transversely of the platform and by constructing the platform so that the crane runway is approximately the length of the body, then the necessary distance for trucking between a car and body is decreased to a minimum, and therefor considerable time is saved in the course of a working day.

Assuming that a station shown in Fig. 1 is located at the "break bulk" point, and that the cars 18 and 19 loaded with inbound freight, and assuming further that the bodies 13 disposed on the platform are empty and are destined for sub-station transfer, or for any other point, then the freight within the cars 18 and 19 is hand trucked across the truck runway 14, and dispersed into the bodies in accordance with the destination to which the freight is consigned. Usually, the practice is to have one body held until is is entirely loaded with freight consigned to one point, but if the contents from one car is not sufficient to load such body then the body may be raised overhead by the crane 25 and deposited adjacent another loaded car. As soon as each body is loaded, it is sealed and transferred to an unloaded automobile truck in the runway 20, and immediately dispatched to its destination. In returning from the destinatiton, the automobile truck may bring back another empty body or a loaded body in accordance with the orders of a dispatcher who controls the various stations of the city by telephone or otherwise.

The unloading of the inbound cars is carried on simultaneously along the entire platform and the loaded bodies are dispersed to their destination as soon as they are completely loaded. Assuming then that the returning automobile trucks convey bodies loaded with outbound freight, then the bodies are immediately deposited on the platform and as near as possible to the car designated to receive such freight. Then as soon as all of the inbound cars are unloaded the entire station may be changed into an outbound station, and the contents of the loaded bodies dispersed into the respective cars. The dotted lines in Fig. 1 show the convenience afforded by the arrangement of the bodies adjacent the station lines, and the arrows indicate the route of travel between the cars and bodies.

By arranging the transportation lines and the bodies as shown, the station may be handled as an inbound station or as an outbound station at one time. However, if it is so desired, both the inbound and outbound freight may be dispersed simultaneously, without having the men who are working on the inbound side conflicting with those who are employed on the outbound side. Under the latter arrangement the entire bulk of inbound freight may be unloaded within a few hours and in like manner the outbound freight may be loaded in the same time. Then as soon as the outbound cars are pulled away, the empty inbound cars then become the outbound side and the train load of inbound freight may be placed on the former outbound tracks.

Since each body is provided with a doorway in each end thereof, it is, of course, obvious that the transposition of the inbound and outbound side has no effect upon the position of the body. As above explained, each body may be conveniently positioned with relation to the cars being loaded or unloaded and such positioning may be accomplished irrespective of the amount of freight in such body. In view of the fact that the bodies are portable with relation to the cars, it is possible to store the freight into the cars in such manner that a train is made up for direct line movement at the "break bulk" point so that it is unnecessary to transport the cars to a classification yard for further car classification.

In accordance with the above description, it will be seen that I have provided a system for handling freight at a terminal station, which system is quite flexible in that it is readily adapted to the rapid handling of both inbound and outbound freight. An advantage of such system is that the freight need be handled only once, and that the amount of trucking required between the cars and bodies is reduced to a minimum by reason of the fact that the portable storage containers may be quickly shifted in accordance with the position of the cars being loaded or unloaded. In addition, it will be seen that I have provided a system which is readily adapted for expansion in accordance with the requirements for freight being handled.

Having thus described my invention, I claim:

1. In combination, a station platform, transportation lines extending on each side thereof, portable containers positioned in a row on the platform and intermediate said lines, each of said containers having a doorway in opposite walls thereof, whereby freight may be transferred from either of said lines directly into the containers.

2. In combination, a station platform, a row of removable automobile bodies extending along the center thereof, sets of railroad tracks one on each side of the platform and longitudinal trucking spaces respectively intermediate the row of bodies and the adjacent track, whereby freight may be transferred directly between the bodies and the cars on the tracks.

3. In combination, a station platform, transportation lines extending on each side thereof, portable containers positioned in a row on the platform and intermediate said lines, each of said containers having a doorway in opposite walls thereof, said platform having a longitudinal trucking space on each side of said row between it and the adjacent transportation line, whereby freight may be transferred from either line into the container without shifting the container on the platform.

4. In combination, a station platform and inbound and outbound transportation cars on each side of the platform, removable automobile bodies adapted to be positioned side by side transversely of the platform and a longitudinally movable traveling crane at such elevation above the platform that it may raise a body and transport it over other bodies.

5. In combination, a station platform, railroad tracks extending lengthwise of the platform and on each side thereof, a truck runway at one end of the platform, a set of removable automobile bodies adapted to be positioned in a row along the middle portion of the platform, an overhead structure extending lengthwise of the platform, and means carried by said structure for transporting bodies between the runway and platform, one body passing over another, said platform having a width providing space on each side of the bodies for trucking to and from the railroad cars.

6. In combination a station platform, a row of removable automobile bodies extending along the center thereof, railroad tracks on each side of the platform and a truck space intermediate the row of bodies and of said tracks and each of said bodies having a doorway in opposite walls whereby freight may be transferred between the bodies and cars positioned on the tracks without shifting the bodies relatively to the platform, and means for raising the bodies and shifting them lengthwise of the platform over one another.

7. In combination, a station platform and a row of removable automobile bodies extending longitudinally thereof, each of said bodies having a doorway in opposite walls thereof, and each of said bodies being positioned transversely of the platform, an enclosed structure extending over the bodies, means carried by said structure for raising and transporting bodies longitudinally of the platform, railroad tracks extending along each side of the platform, and two hand trucking runways, each intermediate the row of bodies and one of said tracks.

8. In combination, a station platform, transportation cars on each side of the platform, removable automobile bodies positioned side by side transversely of the platform, each of said bodies having a doorway in the wall adjacent the side of the platform, whereby freight may be transferred simultaneously between the bodies and either of said sets of cars.

9. In combination, a station platform, a set of removable automobile bodies positioned in a row and transversely of the platform, a set of railroad cars on each side of the platform, a truck runway transversely of the platform and at one end thereof, each of said bodies having a doorway in the ends facing the sides of the platform, whereby freight may be simultaneously loaded or unloaded in the body from either end thereof, and means for raising and transporting the bodies overhead between the runway and platform, whereby a body may be shifted longitudinally of the platform to bring it adjacent the car being loaded or unloaded.

10. In combination, a station platform, a set of railroad tracks extending lengthwise of the platform and on each side thereof, a truck runway at one end of the platform, a set of removable automobile bodies positioned side by side along the middle portion and transversely of the platform, each of said bodies having a doorway in opposite ends thereof, an enclosed structure extending over the body and over the runway, and means carried by said structure for transporting bodies between the runway and platform, said structure having a width slightly greater than the length of the bodies to be transported.

In testimony whereof, I hereunto affix my signature.

BENJAMIN F. FITCH.